United States Patent
Watanabe

(10) Patent No.: US 8,233,183 B2
(45) Date of Patent: Jul. 31, 2012

(54) PRINTING APPARATUS, PRINT SYSTEM, AND PROGRAM PRODUCT THEREFOR

(75) Inventor: Masaki Watanabe, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1309 days.

(21) Appl. No.: 11/692,324

(22) Filed: Mar. 28, 2007

(65) Prior Publication Data

US 2008/0030782 A1 Feb. 7, 2008

(30) Foreign Application Priority Data

Jul. 28, 2006 (JP) ................................. 2006-205803

(51) Int. Cl.
*G06K 15/00* (2006.01)
*G06F 3/12* (2006.01)
*G06F 11/00* (2006.01)
*G06F 15/16* (2006.01)
*G06F 15/167* (2006.01)
*H04N 1/46* (2006.01)
*G41J 3/42* (2006.01)

(52) U.S. Cl. ..................... 358/1.16; 358/1.15; 358/1.17; 358/1.18; 358/1.14; 358/524; 400/72; 400/73; 400/74; 400/62; 709/208; 709/212; 709/217

(58) Field of Classification Search ........................ None
See application file for complete search history.

(56) References Cited

U.S. PATENT DOCUMENTS

| | | | | |
|---|---|---|---|---|
| 5,204,968 A * | 4/1993 | Parthasarathi | ................ | 715/707 |
| 5,218,406 A * | 6/1993 | Ebner | .............................. | 399/11 |
| 5,224,207 A * | 6/1993 | Filion et al. | ..................... | 358/1.1 |
| 5,245,368 A * | 9/1993 | Farrell et al. | .................. | 358/401 |
| 5,923,013 A * | 7/1999 | Suzuki et al. | ................. | 235/375 |
| 6,052,198 A * | 4/2000 | Neuhard et al. | ............. | 358/1.15 |
| 7,298,508 B2 * | 11/2007 | Furukawa et al. | ........... | 358/1.15 |
| 7,595,900 B2 * | 9/2009 | Sakamoto | ..................... | 358/1.13 |
| 7,800,767 B2 * | 9/2010 | Matsushima et al. | ......... | 358/1.1 |
| 7,808,685 B2 * | 10/2010 | Gehring et al. | ............... | 358/518 |
| 2003/0056672 A1 * | 3/2003 | Ueda et al. | ..................... | 101/483 |
| 2003/0085942 A1 | 5/2003 | Narusawa et al. | | |
| 2003/0107756 A1 * | 6/2003 | Dan et al. | ..................... | 358/1.14 |
| 2004/0021905 A1 * | 2/2004 | Holmstead et al. | .......... | 358/1.16 |
| 2004/0126166 A1 * | 7/2004 | Miyake | .......................... | 400/74 |
| 2005/0094184 A1 * | 5/2005 | Suyehira | ...................... | 358/1.14 |
| 2005/0141032 A1 * | 6/2005 | Yamamoto | ................... | 358/1.17 |
| 2005/0190399 A1 * | 9/2005 | Nakaoka et al. | ............. | 358/1.15 |
| 2006/0078230 A1 | 4/2006 | Kimura | | |
| 2006/0209337 A1 * | 9/2006 | Atobe et al. | ................. | 358/1.15 |
| 2006/0227356 A1 * | 10/2006 | Jeong et al. | .................. | 358/1.13 |
| 2007/0104525 A1 * | 5/2007 | Isshiki | ........................... | 400/62 |
| 2007/0223035 A1 * | 9/2007 | Murakami | ................... | 358/1.16 |

(Continued)

FOREIGN PATENT DOCUMENTS

JP 05-162409 A 6/1993

(Continued)

*Primary Examiner* — Hilina S Kassa
(74) *Attorney, Agent, or Firm* — Sughrue Mion, PLLC

(57) ABSTRACT

A printing apparatus includes: a detecting portion that detects a connection with an external storage device that stores print data and print completed page information of the print data; a reading portion that reads the print data and the print completed page information from the external storage device; and a printing portion that prints the print data from a next page of a print completed page with reference to the print completed page information.

22 Claims, 13 Drawing Sheets

U.S. PATENT DOCUMENTS

2008/0030746 A1 * 2/2008 Matsunaga et al. ............ 358/1.1

FOREIGN PATENT DOCUMENTS

| | | |
|---|---|---|
| JP | 2000-289300 A | 10/2000 |
| JP | 2001-138584 A | 5/2001 |
| JP | 2002-55799 A | 2/2002 |
| JP | 2003-001878 A | 1/2003 |
| JP | 2003-175657 A | 6/2003 |
| JP | 2005-138531 A | 6/2005 |
| JP | 2005-184200 A | 7/2005 |
| JP | 2005-234910 A | 9/2005 |
| JP | 2006-060484 A | 3/2006 |

* cited by examiner

FIG. 3

| ADDRESS | 00 | 01 | 02 | 03 | 04 | 05 | 06 | 07 | 08 | 09 | 0A | 0B | 0C | 0D | 0E | 0F | 0123456789ABCDEF |
|---|---|---|---|---|---|---|---|---|---|---|---|---|---|---|---|---|---|
| 00000000 | 1B | 25 | 2D | 31 | 32 | 33 | 34 | 35 | 58 | 40 | 50 | 4A | 4C | 20 | 4A | 4F | .%-12345X@PJL JO |
| 00000010 | 42 | 20 | 4D | 4F | 44 | 45 | 3D | 50 | 52 | 49 | 4E | 54 | 45 | 52 | 0A | 40 | B MODE=PRINTER.@ |
| 00000020 | 50 | 4A | 4C | 20 | 53 | 45 | 54 | 20 | 4A | 4F | 42 | 41 | 54 | 54 | 52 | 3D | PJL SET JOBATTR= |
| 00000030 | 22 | 40 | 4C | 55 | 4E | 41 | 3D | 6D | 61 | 73 | 61 | 6B | 69 | 22 | 0A | 40 | "@LUNA=masaki".@ |
| 00000040 | 50 | 4A | 4C | 20 | 53 | 45 | 54 | 20 | 43 | 4F | 50 | 49 | 45 | 53 | 3D | 31 | PJL SET COPIES=1 |
| 00000050 | 0A | 40 | 50 | 4A | 4C | 20 | 53 | 45 | 54 | 20 | 51 | 54 | 59 | 3D | 31 | 0A | .@PJL SET QTY=1. |
| 00000060 | 40 | 50 | 4A | 4C | 20 | 53 | 45 | 54 | 20 | 4A | 4F | 42 | 41 | 54 | 54 | 52 | @PJL SET JOBATTR |
| 00000070 | 3D | 22 | 40 | 54 | 52 | 43 | 48 | 3D | 4F | 46 | 46 | 22 | 0A | 40 | 50 | 4A | ="@TRCH=OFF".@PJ |
| 00000080 | 4C | 20 | 53 | 45 | 54 | 20 | 44 | 55 | 50 | 4C | 45 | 58 | 3D | 4F | 46 | 46 | L SET DUPLEX=OFF |
| 00000090 | 0A | 40 | 50 | 4A | 4C | 20 | 53 | 45 | 54 | 20 | 42 | 49 | 4E | 44 | 49 | 4E | .@PJL SET BINDIN |
| 000000A0 | 47 | 3D | 4C | 4F | 4E | 47 | 45 | 44 | 47 | 45 | 0A | 40 | 50 | 4A | 4C | 20 | G=LONGEDGE.@PJL |
| 000000B0 | 53 | 45 | 54 | 20 | 4A | 4F | 42 | 41 | 54 | 54 | 52 | 3D | 22 | 40 | 53 | 50 | SET JOBATTR="@SP |
| 000000C0 | 53 | 45 | 3D | 41 | 55 | 54 | 4F | 22 | 0A | 40 | 50 | 4A | 4C | 20 | 53 | 45 | SE=AUTO".@PJL SE |
| 000000D0 | 54 | 20 | 4A | 4F | 42 | 41 | 54 | 54 | 52 | 3D | 22 | 40 | 41 | 50 | 53 | 50 | T JOBATTR="@APSP |
| 000000E0 | 3D | 4F | 46 | 46 | 22 | 0A | 40 | 50 | 4A | 4C | 20 | 53 | 45 | 54 | 20 | 52 | =OFF".@PJL SET R |
| 000000F0 | 45 | 4E | 44 | 45 | 52 | 4D | 4F | 44 | 45 | 3D | 43 | 4F | 4C | 4F | 52 | 0A | ENDERMODE=COLOR. |
| 00000100 | 40 | 50 | 4A | 4C | 20 | 53 | 45 | 54 | 20 | 45 | 43 | 4F | 4E | 4F | 4D | 4F | @PJL SET ECONOMO |
| 00000110 | 44 | 45 | 3D | 4F | 46 | 46 | 0A | 40 | 50 | 4A | 4C | 20 | 53 | 45 | 54 | 20 | DE=OFF.@PJL SET |
| 00000120 | 52 | 45 | 54 | 3D | 4F | 4E | 0A | 40 | 50 | 4A | 4C | 20 | 53 | 45 | 54 | 20 | RET=ON.@PJL SET |
| 00000130 | 4A | 4F | 42 | 41 | 54 | 54 | 52 | 3D | 22 | 40 | 49 | 52 | 45 | 43 | 3D | 4F | JOBATTR="@IREC=O |
| 00000140 | 46 | 46 | 22 | 0A | 40 | 50 | 4A | 4C | 20 | 53 | 45 | 54 | 20 | 4A | 4F | 42 | FF".@PJL SET JOB |
| 00000150 | 41 | 54 | 54 | 52 | 3D | 22 | 40 | 54 | 52 | 41 | 50 | 3D | 4F | 46 | 46 | 22 | ATTR="@TRAP=OFF" |
| 00000160 | 0A | 40 | 50 | 4A | 4C | 20 | 53 | 45 | 54 | 20 | 4A | 4F | 42 | 41 | 54 | 54 | .@PJL SET JOBATT |
| 00000170 | 52 | 3D | 22 | 40 | 49 | 45 | 58 | 54 | 3D | 53 | 54 | 41 | 4E | 44 | 41 | 52 | R="@IEXT=STANDAR |
| 00000180 | 44 | 22 | 0A | 40 | 50 | 4A | 4C | 20 | 53 | 45 | 54 | 20 | 4A | 4F | 42 | 41 | D".@PJL SET JOBA |
| 00000190 | 54 | 54 | 52 | 3D | 22 | 40 | 4A | 4F | 45 | 50 | 3D | 22 | 0A | 40 | 50 | 4A | TTR="@JOEP="".@PJ |
| 000001A0 | 4C | 20 | 53 | 45 | 54 | 20 | 4A | 4F | 42 | 41 | 54 | 54 | 52 | 3D | 22 | 40 | L SET JOBATTR="@ |
| 000001B0 | 44 | 41 | 49 | 44 | 3D | 22 | 0A | 40 | 50 | 4A | 4C | 20 | 53 | 45 | 54 | 20 | DAID="".@PJL SET |
| 000001C0 | 4A | 4F | 42 | 41 | 54 | 54 | 52 | 3D | 22 | 40 | 53 | 42 | 4B | 50 | 3D | 4F | JOBATTR="@SBKP=O |
| 000001D0 | 46 | 46 | 22 | 0A | 40 | 50 | 4A | 4C | 20 | 53 | 45 | 54 | 20 | 4A | 4F | 42 | FF".@PJL SET JOB |
| 000001E0 | 41 | 54 | 54 | 52 | 3D | 22 | 40 | 42 | 41 | 4E | 52 | 3D | 44 | 45 | 56 | 49 | ATTR="@BANR=DEVI |
| 000001F0 | 43 | 45 | 22 | 0A | 40 | 50 | 4A | 4C | 20 | 53 | 45 | 54 | 20 | 4A | 4F | 42 | CE".@PJL SET JOB |
| 00000200 | 41 | 54 | 54 | 52 | 3D | 22 | 40 | 4E | 4C | 50 | 50 | 3D | 31 | 22 | 0A | 40 | ATTR="@NLPP=1".@ |

FIG. 4

| FILE NAME | NUMBER OF PAGES | PRINT COMPLETED PAGE | PRINT SHEET SIZE | PRINT SHEET TYPE | PRINT COLOR |
|---|---|---|---|---|---|
| CONFERENCE MATERIAL 1.PDF | 20 | 13 | A4 | RECYCLE PAPER | BLACK AND WHITE |
| RESEARCH RESULT.PPT | 35 | 0 | ... | ... | ... |
| ⋮ | ⋮ | ⋮ | ⋮ | ⋮ | ⋮ |

| SERVER NAME | SERVER ADDRESS INFORMATION | USER NAME (ACCOUNT NAME) | PASSWORD |
|---|---|---|---|
| Server | 129.249.×××. | Taro | ○×△□ |

ID: 8,233,183 B2

PRINTING APPARATUS, PRINT SYSTEM, AND PROGRAM PRODUCT THEREFOR

BACKGROUND

1. Technical Field

This invention relates to a printing apparatus, a print system, and a program product therefor.

2. Related Art

A complex machine including a printer or a printer function is often used in a state that the complex machine is connected with multiple user PCs (Personal Computers) over a network. In such a structure, the printer is shared by multiple users. Thus, it is highly possible that a printed matter is seen by people other than a person who directs printing. As a result, it is necessary to take some measures to print a classified document.

SUMMARY

According to an aspect of the present invention, there is provided a printing apparatus including: a detecting portion that detects a connection with an external storage device that stores print data and print completed page information of the print data; a reading portion that reads the print data and the print completed page information from the external storage device; and a printing portion that prints the print data from a next page of a print completed page with reference to the print completed page information.

BRIEF DESCRIPTION OF THE DRAWINGS

Exemplary embodiments of the present invention will be described in detail based on the following figures, wherein:

FIG. 3 is a diagram showing a PJL command;

FIG. 4 is a diagram showing print management data recorded in a management table;

DETAILED DESCRIPTION

A description will be hereinafter given of exemplary embodiments of the invention with reference to the attached drawings.

First Exemplary Embodiment

Figure 1:
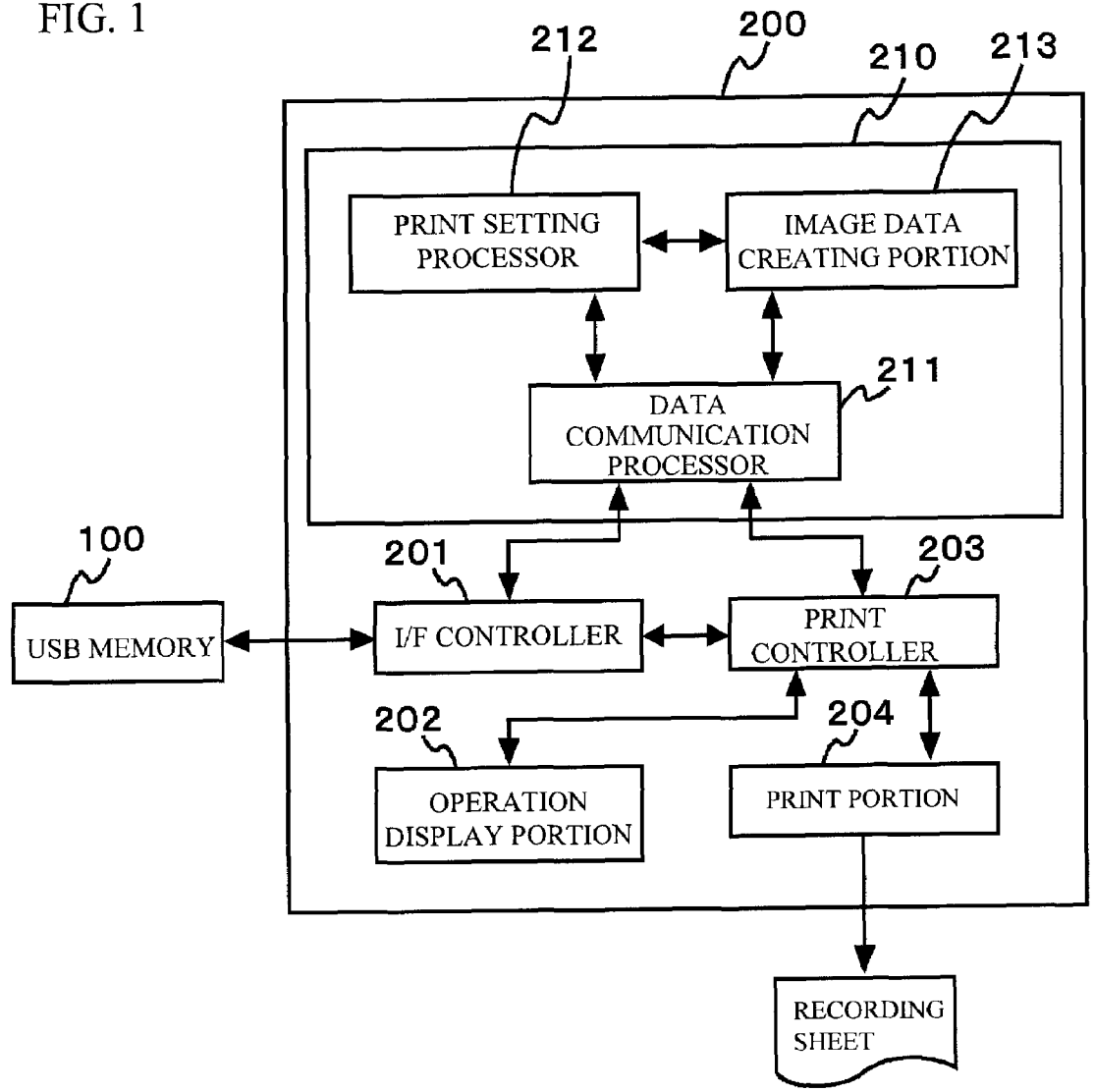
FIG. 1 is a diagram showing a printer structure employed in a first exemplary embodiment and a USB memory connected to the printer.

Firstly, a description will be given of a structure of a first exemplary embodiment with reference to FIG. 1. This exemplary embodiment includes a USB (Universal Serial Bus) memory 100 serving as an external storage device and a printer 200 serving as a printing apparatus. The external storage device and the printing apparatus are not limited the aforementioned ones. For example, as the external storage device, a removable recording medium is used. As the printing apparatus, a complex machine including functionalities as a copying machine, a facsimile, a printer and the like may also be used.

Figure 2:
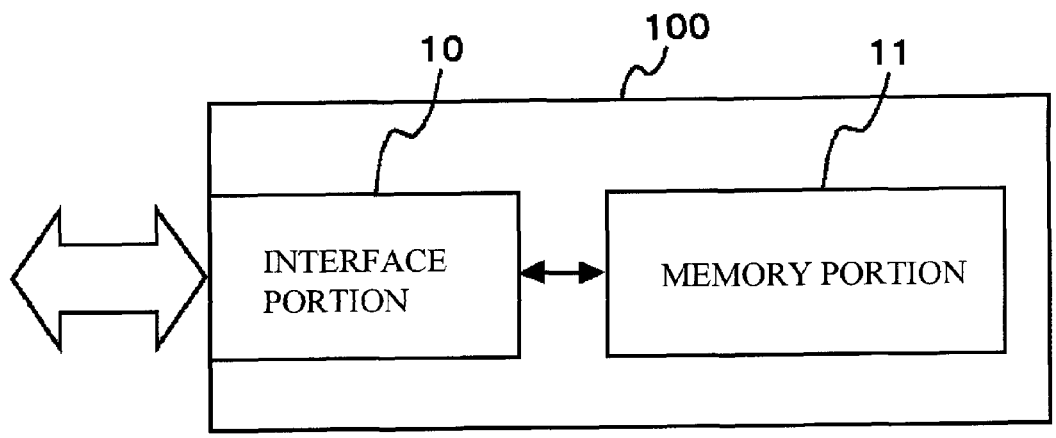
FIG. 2 shows a diagram showing a structure of the USB memory.

The USB memory 100 is connectable with a USB port of a personal computer or that of the printer 200. As shown in FIG. 2, the USB memory 100 includes an interface 10 and a memory 11. The interface 10 forms an interface with an external device such as a computer, and has a configuration of common USB memories. The interface 10 is equipped with, for example, a USB controller (hardware) and software that accomplishes functions such as initialization, connection, data transfer, and disconnection. The memory 11 stores print data and print management data described later.

A printer 200A of the first exemplary embodiment includes an I/F controller 201, an operation display portion 202, a print controller 203, a print portion 204, and a data processor 210. In this exemplary embodiment, the print controller 203 functions as a detecting portion, a reading portion, a printing portion, a deleting portion, a rewriting portion, an acquiring portion, and a transmitting portion.

The I/F controller 201 includes multiple interfaces to be connected with an external device such as the USB memory 100. The I/F controller 201 controls communication with the external device with the interface used by the external device.

The operation display portion 202 includes an operating portion having a group of ten-key and a start key, and a display portion such as a liquid crystal device showing a state of the printing apparatus.

The print controller 203 controls the entire printer 200A. When a connection with the USB memory 100 is recognized, the print controller 203 determines whether or not the print data printable by the printer 200A is stored in the memory 11 of the USB memory 100. As a determination method, for example, there are: a determination method based on whether or not the print data is added with print management data described below; a determination method with reference to an extension provided for the print data; a determination method by analyzing a PJL (Printer Job Language) command, and the like. FIG. 3 shows an example of the PJL command. The command surrounded by a dotted line is the PJL command. The PJL command is added to the start and the end of a PDL (Page Description Language) command. By analyzing the PJL command from the start thereof, the print controller 203 can determine whether or not the print data is printable by the printer 200A.

Further, the print controller 203 monitors an operation state of the print portion 204 and controls a timing to output image data acquired from an image data creating portion 213 to the print portion 204. Furthermore, the print controller 203 records print completed information into the memory 11 of the USB memory 100, whenever the print portion 204 completes printing one page. When printing the print data is completed, the print controller 203 deletes the print management data stored in the memory 11 (described later in detail).

The print portion 204 prints the image data acquired from the print controller 203 on a recording sheet, and controls feeding the recording sheet. Further, the print portion 204 outputs a completion notification signal indicating that printing one page is completed to the print controller 203, whenever printing one page is completed.

The data processor 210 performing data processing of the print data read from the USB memory 100 is provided with: a data communication processor 211; a print setting processor 212; and the image data creating portion 213.

The data communication processor 211 outputs the print data input by the I/F controller 201 to the print setting processor 212. Further, the data communication processor 211 outputs the image data created by the image data creating portion 213, to the print controller 203.

The print setting processor 212 analyzes various types of setting information included in the print data, and notifies the analyzed result to the image data creating portion 213 and the print controller 203. The various types of setting information include: setting for a print sheet, setting for a print quality, print setting such as unit print, and both side printing and the like. Further, the print setting processor 212 sorts out the data in a given order of page number based on the analyzed result, and sends the data on a page basis to the image data creating portion 213.

The image data creating portion 213 creates the image data for every page from the data supplied from the print setting processor 212. The created image data is sent to the print controller 203 via the data communication processor 211.

In the present exemplary embodiment, the print data stored in the USB memory 100 is read, and the read print data is printed by the printer 200A. Then, the print controller 203 of the printer 200A records the print completed page information on the memory 11 of the USB memory 100, whenever printing one page of the print data is completed by the print portion 204. Further, when printing all pages created from the print data is completed, the print controller 203 deletes the print management data recorded in the memory 11.

FIG. 4 shows an example of a management table created in the memory 11 of the USB memory 100. The print management data recorded in the management table is provided for every print data stored in the USB memory 100. As shown in FIG. 4, a file name of the print data recorded in the memory 11, the number of pages of the file, the print completed page information and the like are recorded as data. The print controller 203 of the printer 200A receives the completion notification signal from the print portion 204, whenever printing one page is completed. On receiving the signal, the print controller 203 updates a print completed page of the print management data recorded in the memory 11.

In the print completed page column of the print uncompleted print data, 0 is recorded. The print management data can be recorded in the personal computer side concurrently when the print data is stored in the USB memory 100. Further, in the print management data written into the management table, in addition to the foregoing data, print settings of the print data (for example, settings of print sheet size, print sheet type, black-and-white print, and color print) or the like may be recorded. It is also possible to cause the print management data to read the print controller 203 of the printer 200A, and causes the printer 200A to perform printing according to the settings thereof.

Figure 5A:
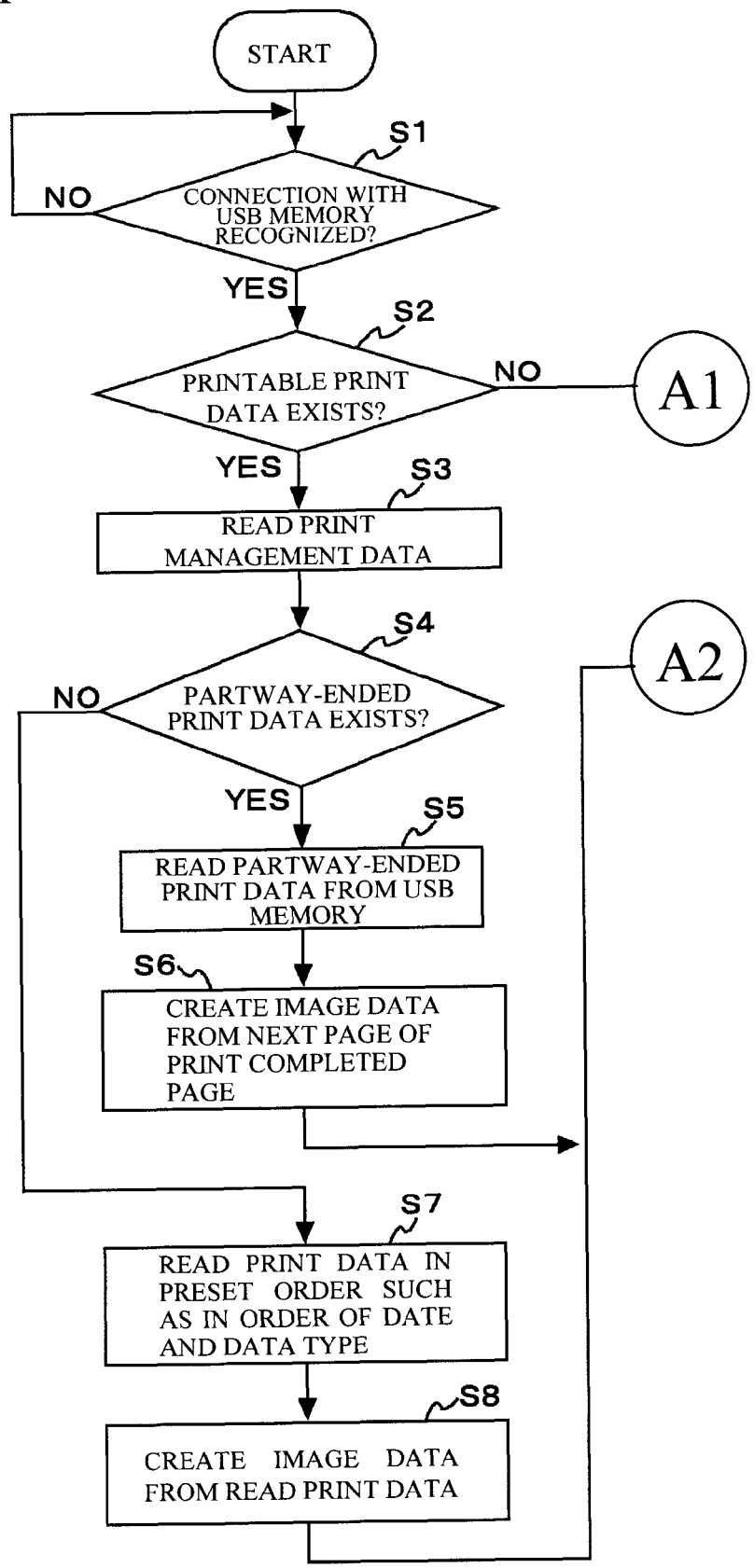
FIG. 5A and FIG. 5B show a flowchart of a processing procedure of the printer according to the first exemplary embodiment.
Figure 5B:
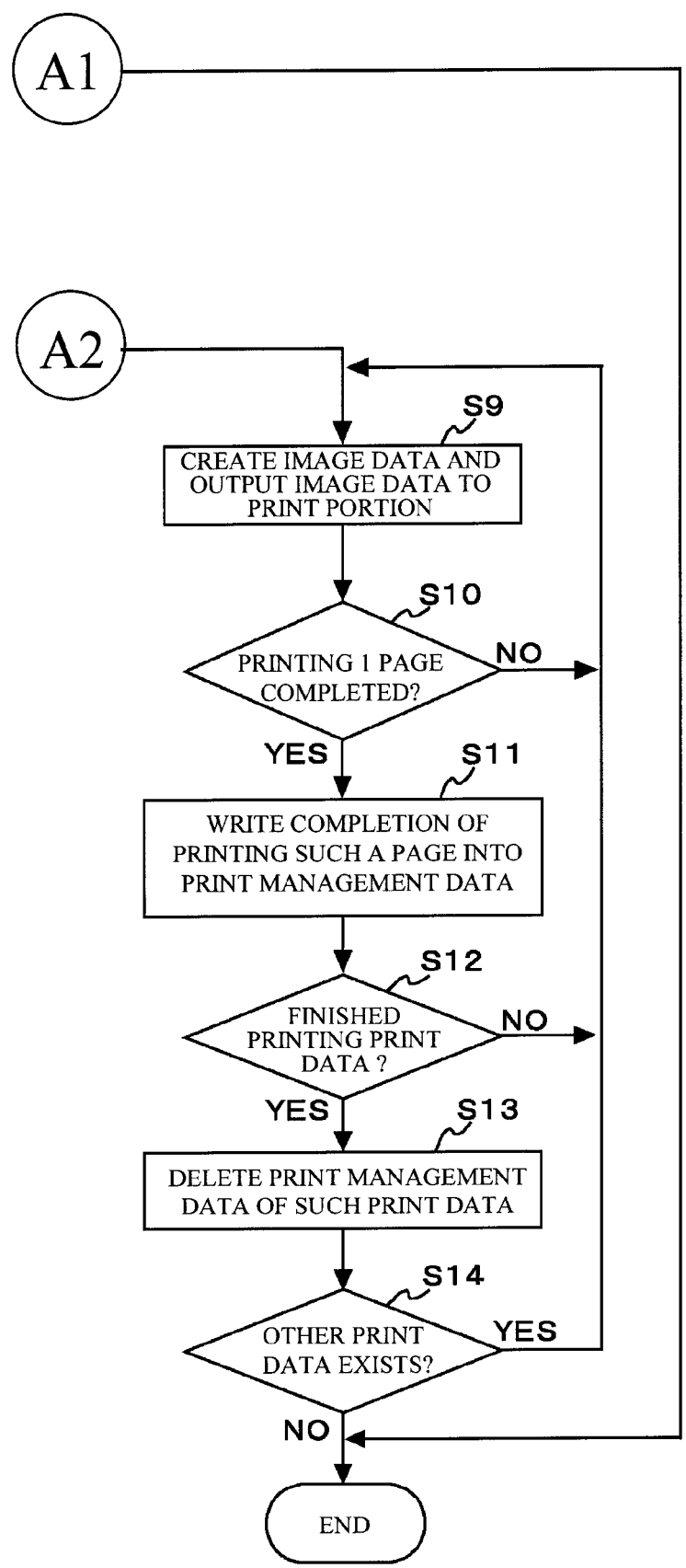

A description will be given of a processing procedure of the printer 200A with reference to the flowchart shown in FIG. 5A and FIG. 5B.

When the I/F controller 201 recognizes the connection with the USB memory 100 (step S1), the print controller 203 determines whether or not printable print data is stored in the memory 11 of the USB memory 100 (step S2). The print controller 203 determines whether or not the print data printable by the printer 200A is stored in the memory 11 by analyzing the extension of the print data stored in the memory 11 and the PJL command through the I/F controller 201. In addition, such determination can be made by checking whether or not the print data recorded with the print management data is stored in the memory 11. When determining that the print data printable by the printer is not stored in the USB memory 100 (step S2/NO), data read processing from the USB memory 100 is ended.

When it is determined that the print data printable by the printer is stored in the USB memory 100 (step S2/YES), the print controller 203 reads the print management data from the USB memory 100 (step S3). The print controller 203 determines whether or not there is print data in which printing is ended in the partway from the print management data that has been read (step S4). When detecting print data having no page of the print completed page information and print is ended in the partway thereof (step S4/YES), the print controller 203 sets preferential processing for such print data. The print controller 203 reads the partway-ended print data from the memory 11 of the USB memory 100 (step S5), and outputs the read data to the print setting processor 212.

When there is no the partway-ended print data (step S4/NO), the print controller 203 sequentially reads the print data in a predetermined order of such as date and data type (step S7), and outputs the read data to the print setting processor 212.

The print setting processor 212 analyzes the print data, sorts out the data according to the print settings from the next page of the print completed page, and transmits the print data on a page basis to the image data creating portion 213.

The image data creating portion 213 creates the image data for every one page from the print data sent from the print setting processor 212 (step S6 or step S8). The created image data is sent to the print portion 204 by means of the control of the print controller 203 (step S9), and is printed on the recording sheet.

When printing one page of the image data is completed, the completion notification signal is output from the print portion 204 to the print controller 203. The print controller 203 inputs the completion notification signal and recognizes that printing one page is completed (step S10/YES), and writes that printing the corresponding page is completed into the print management data stored in the USB memory 100 (step S11).

When printing one page is completed (step S10/YES), the print controller 203 determines whether or not printing the print data in the process is entirely completed (step S12). When printing the print data in the process is not entirely completed (step S12/NO), the processing from step S9 is repeated. In addition, when printing the print data in the process is entirely completed (step S10), the print controller 203 deletes the print management data of the corresponding print data recorded in the USB memory 100 (step S11). After that, the print controller 203 determines whether or not there is another piece of the print data in the USB memory 100. When there is no the print data (step S14/NO), the processing is ended.

Figure 6:
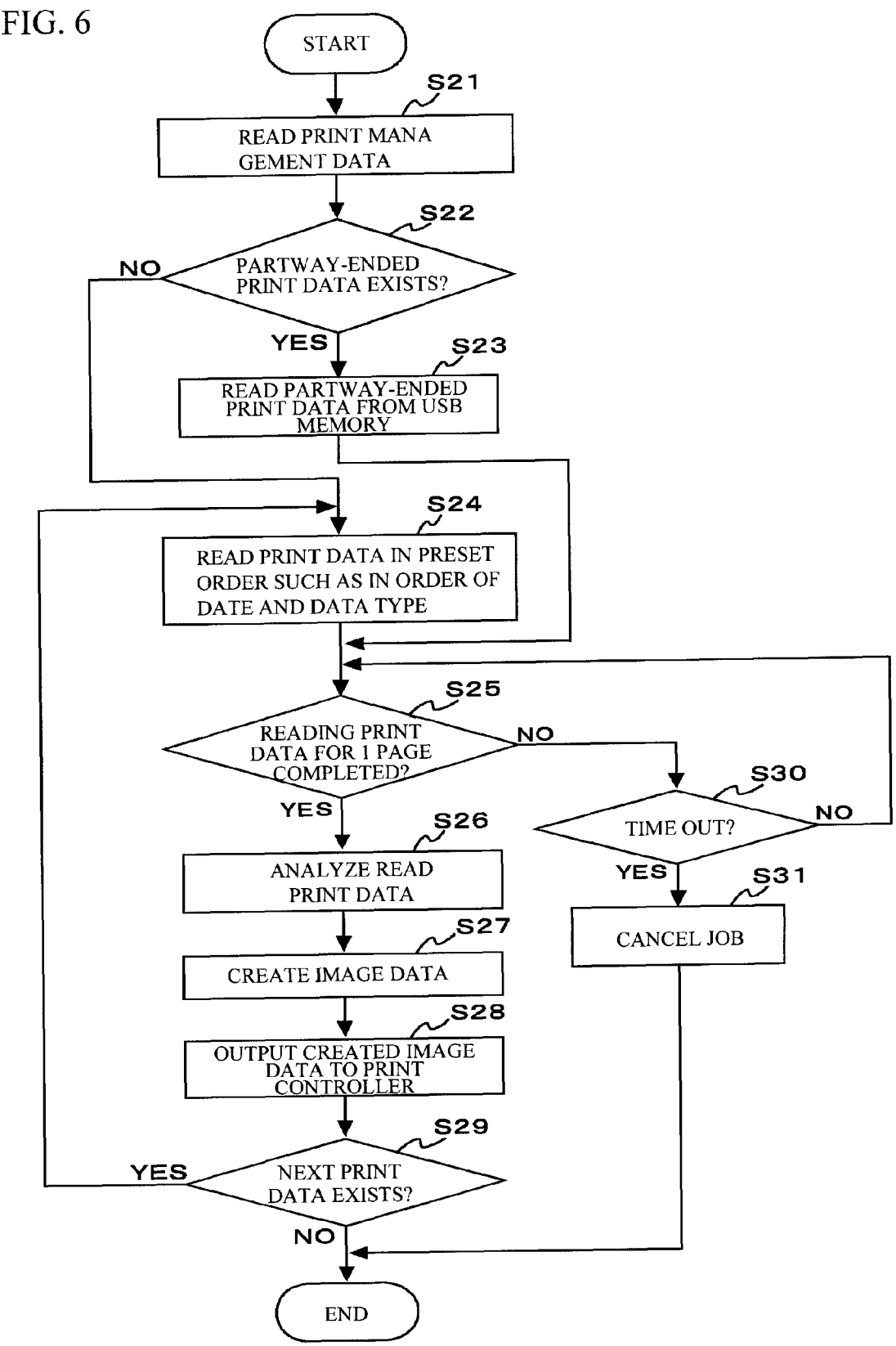
FIG. 6 is a flowchart showing a processing procedure of the printer when the USB memory is removed from the printer in the middle of print processing.

Next, a description will be given, with reference to the flowchart shown in FIG. 6, of a processing procedure of the printer 200 when the USB memory 100 is removed from the printer 200 in the middle of print process of the print data read from the USB memory 100.

When the print controller 203 recognizes a connection with the USB memory 100 and determines that the printable print data is stored in the USB memory 100, the print controller 203 firstly reads the print management data (step S21). The print controller 203 determines whether or not there is the partway-ended print data with reference to the read print management data (step S22). When there is the partway-ended print data (step S22/YES), the print controller 203 starts reading from the partway-ended print data (step S23). Meanwhile, when there is no partway-ended print data (step S22/NO), the print controller 203 sequentially reads the print data in a predetermined order of such as date and data type (step S24).

Next, the print controller 203 determines whether or not reading the print data for one page from the USB memory 100 is completed (step S25). Since the data processor 210 creates the image data for every one page, the print controller 203 determines whether or not the print data for one page is read. When reading the print data for one page is completed (step S25/YES), the print setting processor 212 analyzes the read print data (step S26). According to the analyzed result, the image data creating portion 213 creates the image data (step S27). When the image data for one page is created, the created image data is sent to the print controller 203 (step S28). The print controller 203 determines whether or not the print portion 204 is in a printable state. When the print portion 204 is in the printable state, the print controller 203 outputs the image data to the print portion 204.

In step S25, in a case where the print data for one page cannot be read from the USB memory 100 even after a given time lapses (step S25/NO and step S30/YES), the print controller 203 cancels the job, and discards the print data being read.

Even when print processing is stopped in the partway of the printing operation, the print management data recorded in the USB memory 100 is stored without change. Therefore, when such print data is printed again, the print controller 203 refers to the print management data and starts printing from the next page of the print completed page.

Second Exemplary Embodiment

A description will be given of a second exemplary embodiment of the invention with reference to the attached drawings.

In the present exemplary embodiment, the printer 200 is connected to a network 150, by which multiple personal computers 120 and a server apparatus 300 are connected. Further, whenever printing one page of the print data is completed, the printer 200 transmits the foregoing print completed page information to the server apparatus 300, and updates the print management data.

Figures 7, 8:
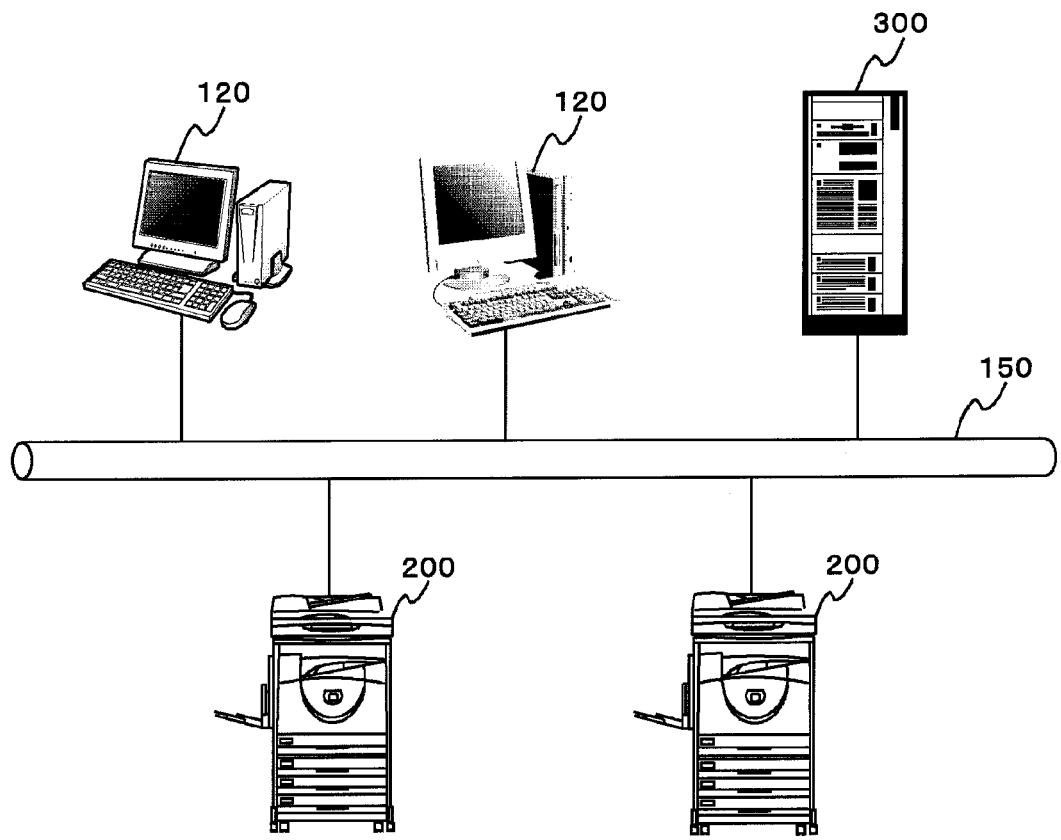
FIG. 7 is a diagram showing a network connection structure.
FIG. 8 is a diagram showing address information stored in the USB memory.

Further, when the print data crated by the personal computer 120 connected to the network 150 is stored in the USB memory 100, the print management data of the print data stored in the USB memory 100 is transmitted to the server apparatus 300 in advance. The personal computer 120 records information to access the server apparatus 300 (hereinafter, referred to as access information) in the memory 11 of the USB memory 100. FIG. 8 shows the access information recorded in the memory 11 of the USB memory 100. As shown in FIG. 8, the access information includes: a server name; a server IP address; an account name (user name) for accessing the server; a password; and the like. The access information may be recorded in the personal computer 120 in advance, and be automatically written when the print data is written. Also, the USB memory 100 may be inserted into the printer 200, and then the address information of the server apparatus 300 connectable with the printer 200 be recorded in the USB memory 100.

Before the print data is printed by the printer 200, information such as a file name and a page of the print data to be printed may be transmitted from the printer 200 to the server apparatus 300 as the print management data.

Figure 9:
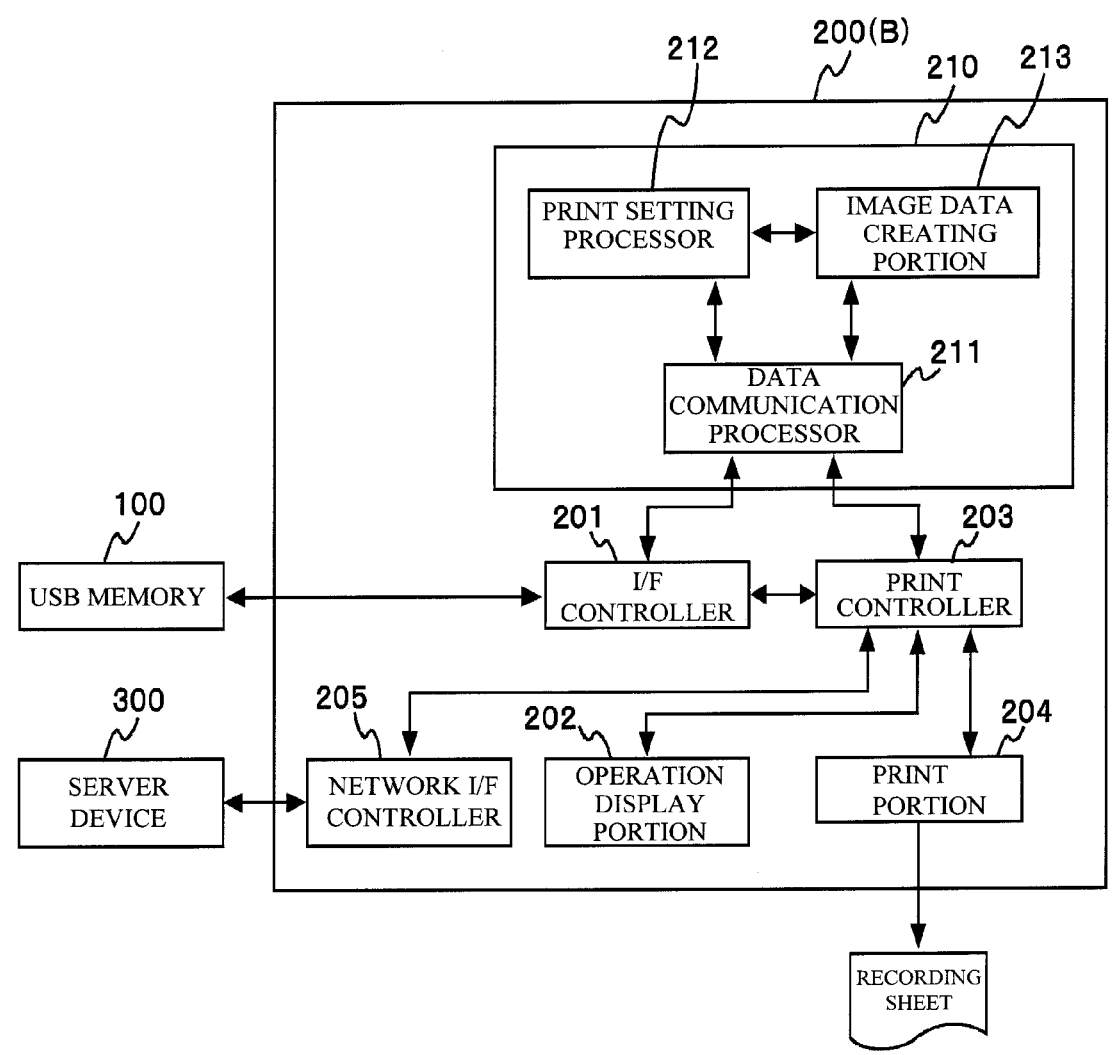
FIG. 9 is a diagram showing a printer structure employed in a second exemplary embodiment, the USB memory connected to the printer, and a server apparatus.

FIG. 9 shows a structure of a printer 200B employed in the present exemplary embodiment. The printer 200B employed in the present exemplary embodiment is further provided with a network I/F controller 205. The network I/F controller 205 controls communication so that the printer 200B can communicate with apparatuses (for example, the server apparatus 300) connected to the network 150.

Figure 10A:
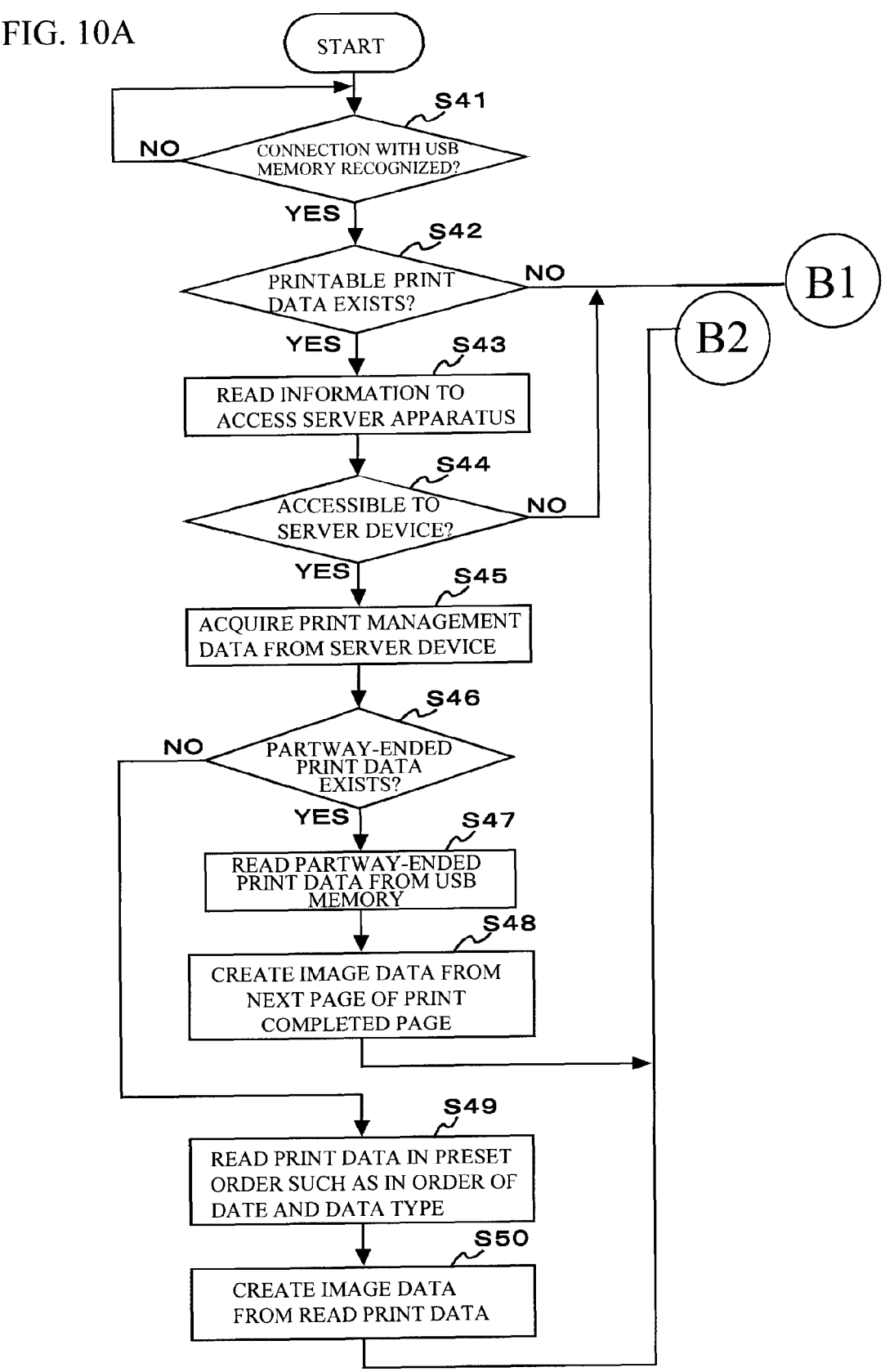
FIG. 10A and FIG. 10B show a flowchart of a processing procedure of the printer according to the second exemplary embodiment.
Figure 10B:
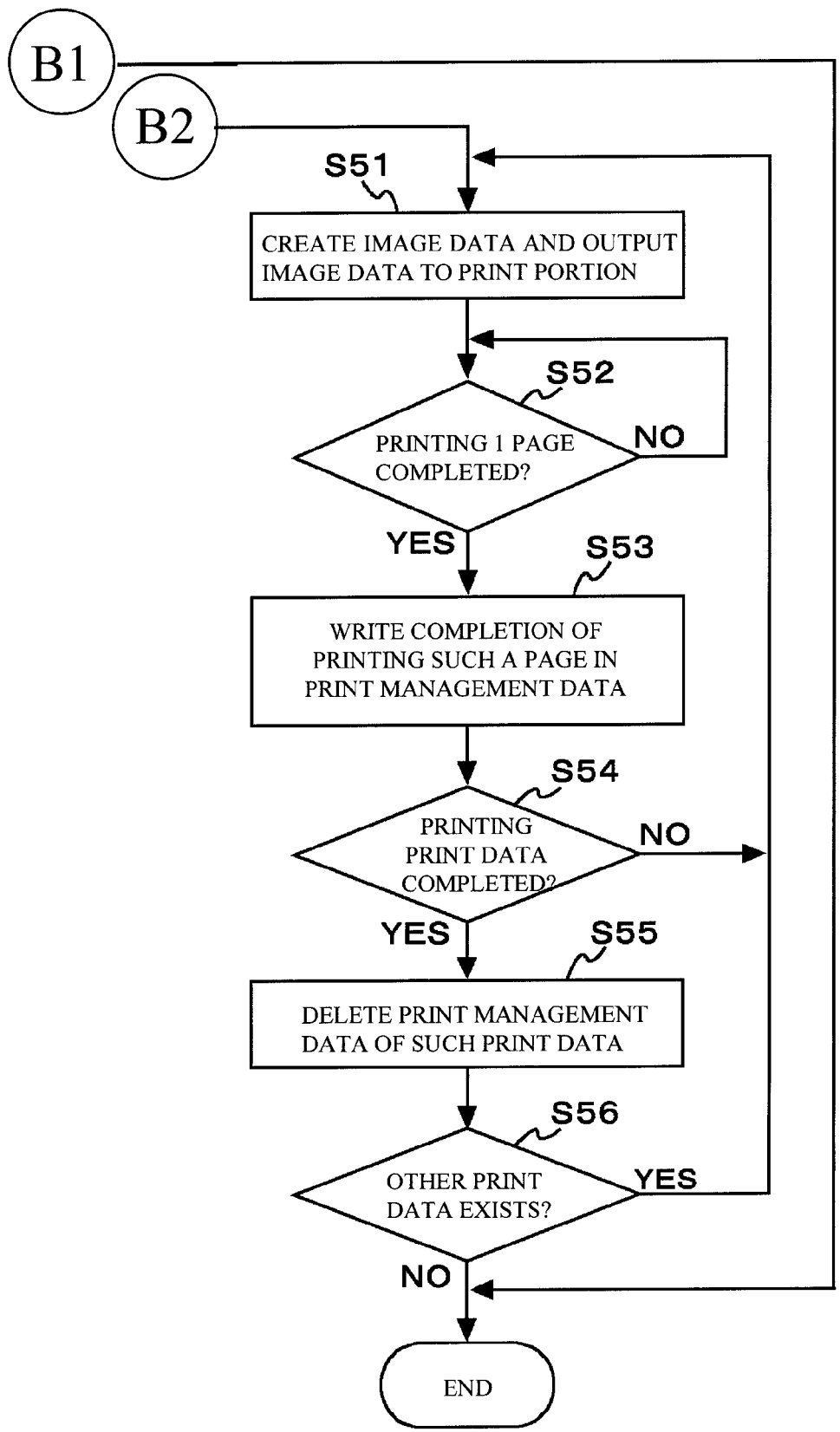

A description will be given of a processing procedure used in the present exemplary embodiment with reference to the flowchart shown in FIG. 10A and FIG. 10B.

When the I/F controller 201 recognizes a connection with the USB memory 100 (step S41), the print controller 203 determines whether or not printable print data is stored in the USB memory 100 by controlling the I/F controller 201 (step S42). When it is determined that there is no printable print data stored (step S42/NO), the processing is ended. Meanwhile, when it is determined that there is the printable print data stored in the USB memory 100 (step S42/YES), the print controller 203 retrieves the access information for connecting the server apparatus 300 from the USB memory 100 (step S43). Based on the acquired access information, the print controller 203 accesses the server apparatus 30. When the access to the server apparatus 300 fails (step S44/NO), the operation display portion 202 displays that the connection with the server apparatus 300 has failed, and ends the processing.

When the access to the server apparatus 300 is successful (step S44/YES), the print controller 203 acquires the print management data stored in the server apparatus 300. The print controller 203 determines whether or not there is the partway-ended print data, with reference to the print management data acquired from the server apparatus 300 (step S46). When there is the partway-ended print data (step S46/YES), the print controller 203 sets so that the aforementioned print data is processed on a priority basis. The print controller 203 reads the partway-ended print data from the memory 11 of the USB memory 100 (step S47), and outputs the read data to the print setting processor 212.

When determining that the print halfway completed print data does not exist (step S46/NO), the print controller 203 reads the print data in the preset order such as in order of date and data type (step S49), and outputs the read data to the data processor 210.

The print setting processor 212 of the data processor 210 analyzes the print data. According to the analyzed result, the image data creating portion 213 creates the image data. When the image data for one page is created (step S48 or S50), the created image data is sent to the print controller 203. The print controller 203 determines whether or not the print portion 204 is in a printable state. When the print portion 204 is in the printable state, the print controller 203 outputs the image data to the print portion 204 (step S51). When the print portion 204 receives the image data, the print portion 204 prints the received image data on the recording sheet.

Whenever printing one page is completed (step S52/YES), the completion notification signal is output from the print portion 204 to the print controller 203. When the print controller 203 receives the completion notification signal, the print controller 203 recognizes that printing one page is completed, transmits the print completed page information to the server apparatus 300, and updates the print management data (step S53). The print controller 203 transmits the print completed page information to the server apparatus 300 via the network I/F controller 205. When the server apparatus 300 receives the page information from the printer 200, the server apparatus 300 rewrites the print management data corresponding to the print data in printing, and records that printing such a page is completed. This processing is performed whenever printing one page is completed.

When printing one page is completed and the print controller 203 transmits the print completed page information to the server apparatus 300 (step S52/YES, step S53), the print controller 203 determines whether or not printing the print data being processed is entirely completed (step S54). When printing the print data being processed is not entirely completed (step S54/NO), the processing from step S51 is repeated. Meanwhile, when printing the print data in processing is entirely completed (step S54/YES), a notification that the print data is entirely completed is output to the server apparatus 300 (step S55). The server apparatus 300 that has received the print completion notification deletes the print management data corresponding to such print data. After that, the print controller 203 determines whether or not there is another type of print data in the USB memory 100. When there is no another type of print data (step S56/NO), the processing is ended.

Third Exemplary Embodiment

A description will be given of a third exemplary embodiment of the invention with reference to the attached drawings.

Figure 11:
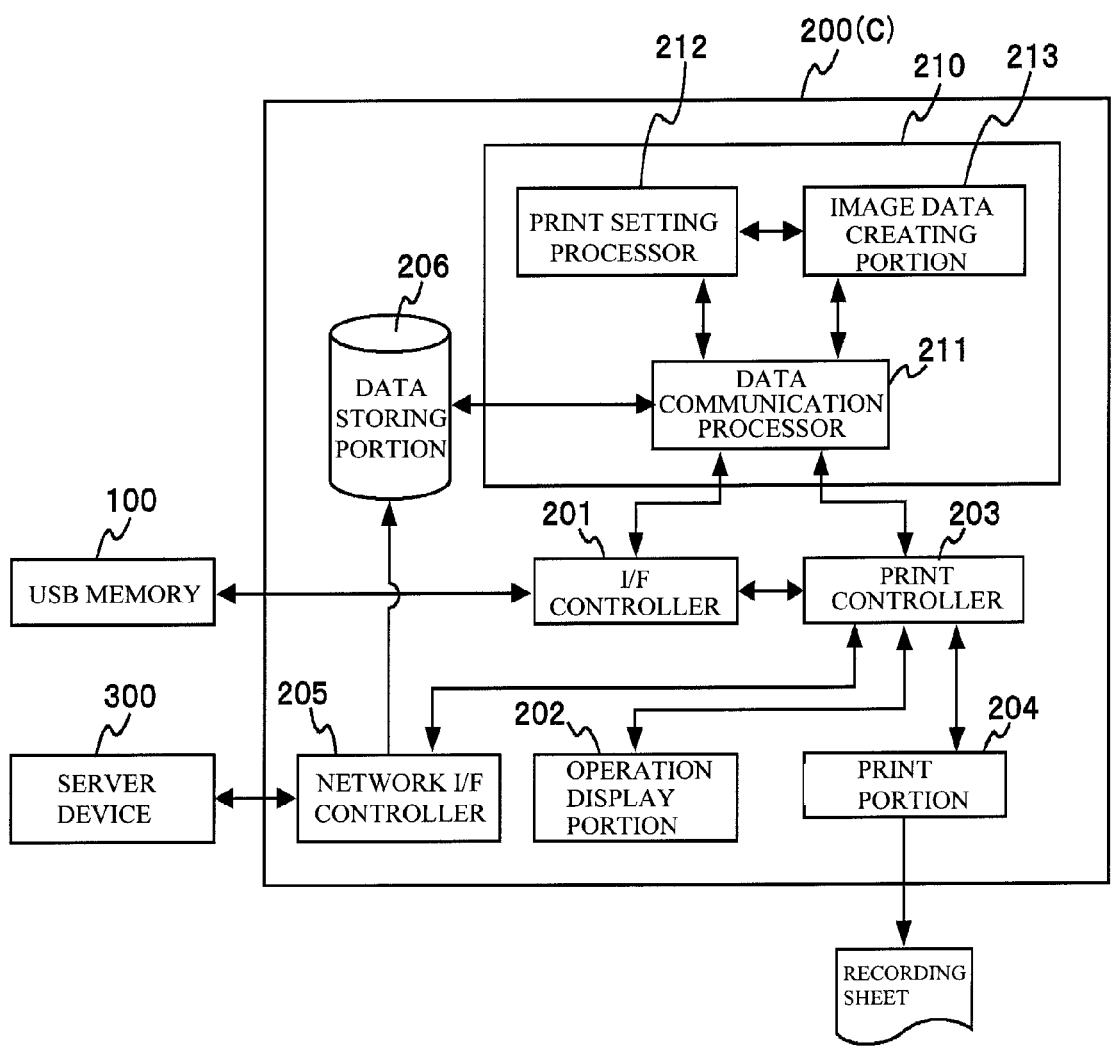
FIG. 11 is a diagram showing a printer structure employed in a third exemplary embodiment, the USB memory connected to the printer, and the server apparatus.

FIG. 11 shows a structure of the third exemplary embodiment. As shown in FIG. 11, this exemplary embodiment has a data storing portion 206 that stores data downloaded from the server apparatus 300. The data communication processor 211 reads the data from the data storing portion 206, and outputs the read data to the print setting processor 212 and to the image data creating portion 213.

In the present exemplary embodiment, the print management data serving as management information of the print data is stored in the USB memory 100, and the print data is stored in the server apparatus 300. When a user creates the print data by a personal computer, the user uploads the created print data to the server apparatus 300. The print data may be compressed in a given compression format, and the compressed print data be stored in the server apparatus 300.

In the USB memory 100, in addition to the foregoing print management data, the access information for accessing the server apparatus 300 is recorded. The structure of the access information is the same as that of the access information used in the second exemplary embodiment shown in FIG. 8.

When the printer 200 reads the print management data and the access information from the USB memory 100, the printer 200 firstly refers to the print management data, and determines whether or not there is effective print management data recorded. The effective print management data means print uncompleted data. When the effective print management data is recorded in the USB memory 100, the print controller 203 is connected with the server apparatus 300 by using the access information. When the print controller 203 is connected with the server apparatus 300, the print controller 203 acquires and prints the print data.

Figure 12A:
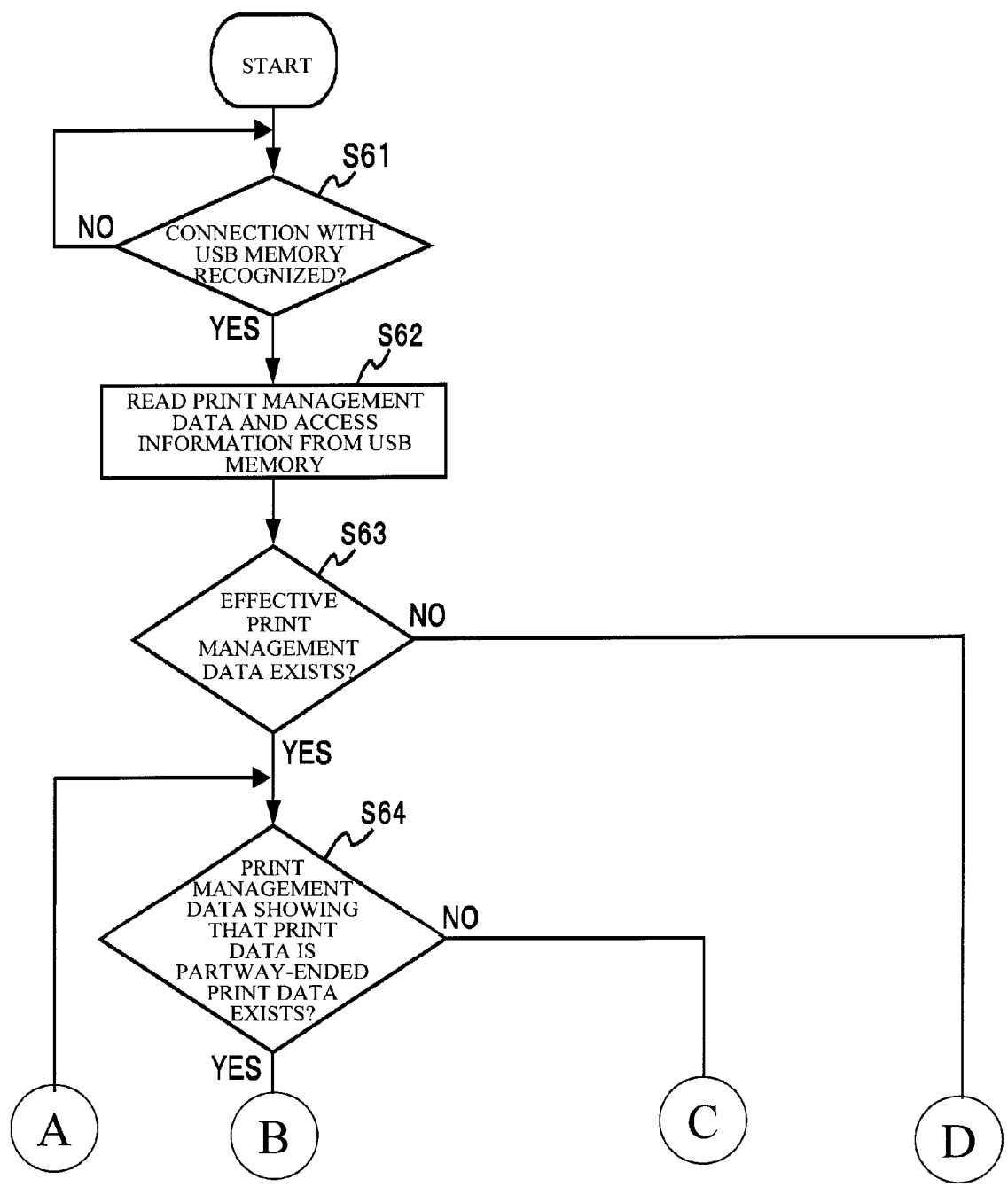
FIG. 12A and FIG. 12B show a flowchart of a processing procedure of the printer according to the third exemplary embodiment.
Figure 12B:
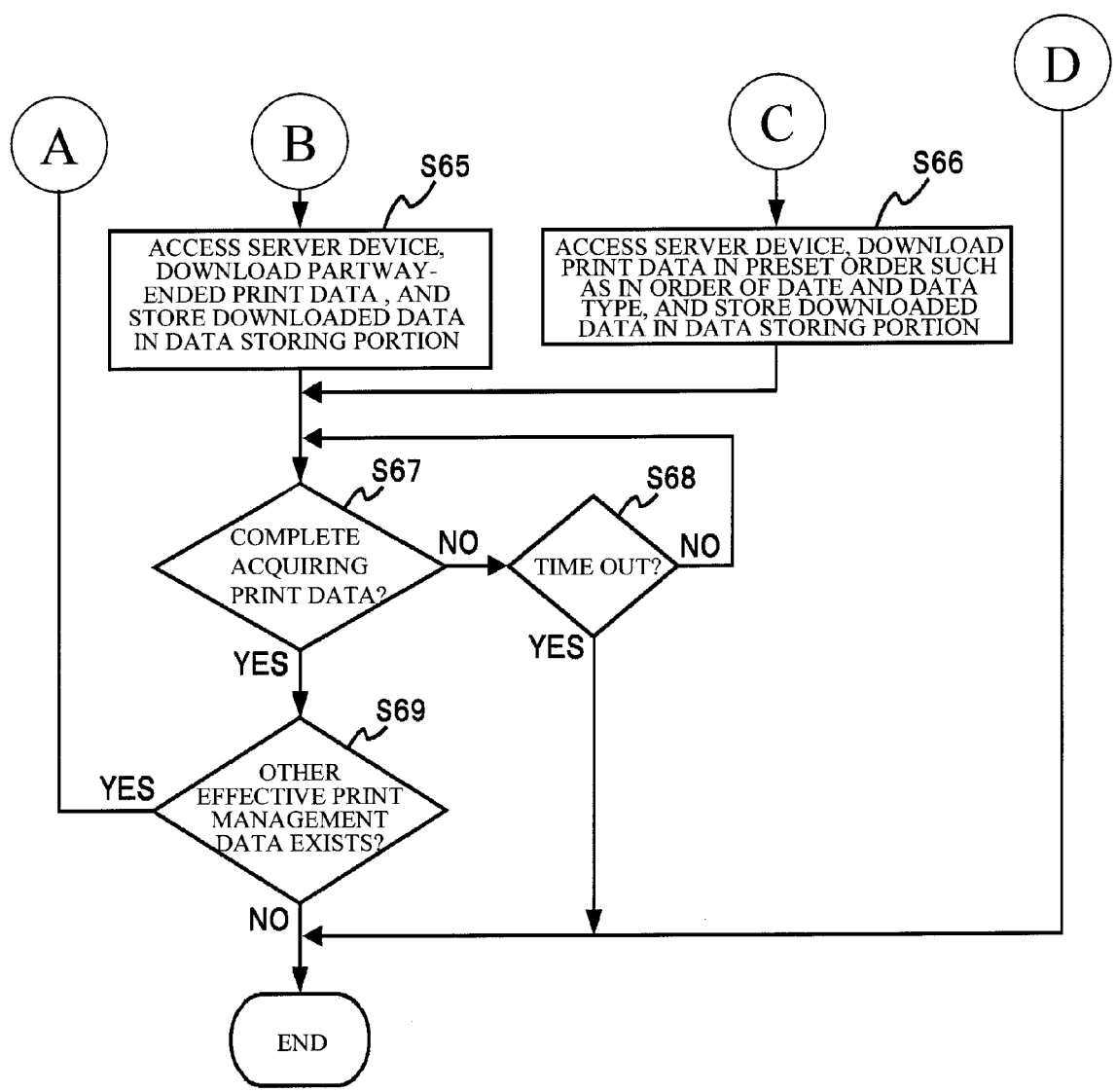

A description will be given of a processing procedure used in the present exemplary embodiment with reference to the flow chart shown in FIG. 12A and FIG. 12B. When the I/F controller 201 recognizes the connection with the USB memory 100 (step S61), the print controller 203 reads the print management data and the access information from the USB memory 100 through the I/F controller 201 (step S62). The print controller 203 determines whether or not the read print management data is effective print management data (step S63). The effective print management data means print uncompleted data, and is the data in which the number of pages of the print management data is not matched with the print completed page shown in FIG. 4. When there is no effective print management data (step S63/NO), the processing is ended.

When determining that there is the effective print management data (step S63/YES), the print controller 203 further determines whether or not the print management data showing that the print data is the partway-ended print data out of the effective print management data (step S64). When the print completed page of the print management data shown in FIG. 4 is not zero and is not matched with the number of pages, it is possible to determine that there is the partway-ended print data.

When determining that there is the partway-ended print data (step S64/YES), the print controller 203 accesses the server apparatus 300 by using the access information, and downloads such print data to the printer 200. The print controller 203 refers to the file name of the print management data, and downloads the print data with such a file name from the server apparatus 300. The print data transmitted through the network 150 is received by the network I/F controller 205, and stored in the data storing portion 206 (step S65).

When determining that there is no partway-ended print data (step S64/NO), the print controller 203 downloads the print data in a predetermined order of such as date and data type, from the server apparatus 300. The downloaded print data is stored in the data storing portion 206 (step S66). In a case where the print data cannot be downloaded from the server apparatus 300 even after a given time lapses (step S68/YES), the print controller 203 controls displaying that downloading the print data fails, on the operation display portion 202.

When downloading the print data is completed (step S67/YES), the print controller 203 determines whether or not there is another piece of effective print management data (step S69). When there is another piece of effective print management data (step S69/YES), the processing from step S64 continues. Meanwhile, when there is no another piece of effective print management data (step S69/NO), the processing is ended.

After that, the print controller 203 reads the print data stored in the data storing portion 206 through the data communication processor 211, analyzes the print data, and creates the image data. When the print data is compressed, the print data should be uncompressed by the data communication processor 211, and then the uncompressed print data should be output to the print setting processor 212.

As in the foregoing first exemplary embodiment, when printing one page of the print data is completed, the print controller 203 records the print completed page information in the print management data of the USB memory 100.

Figure 13:
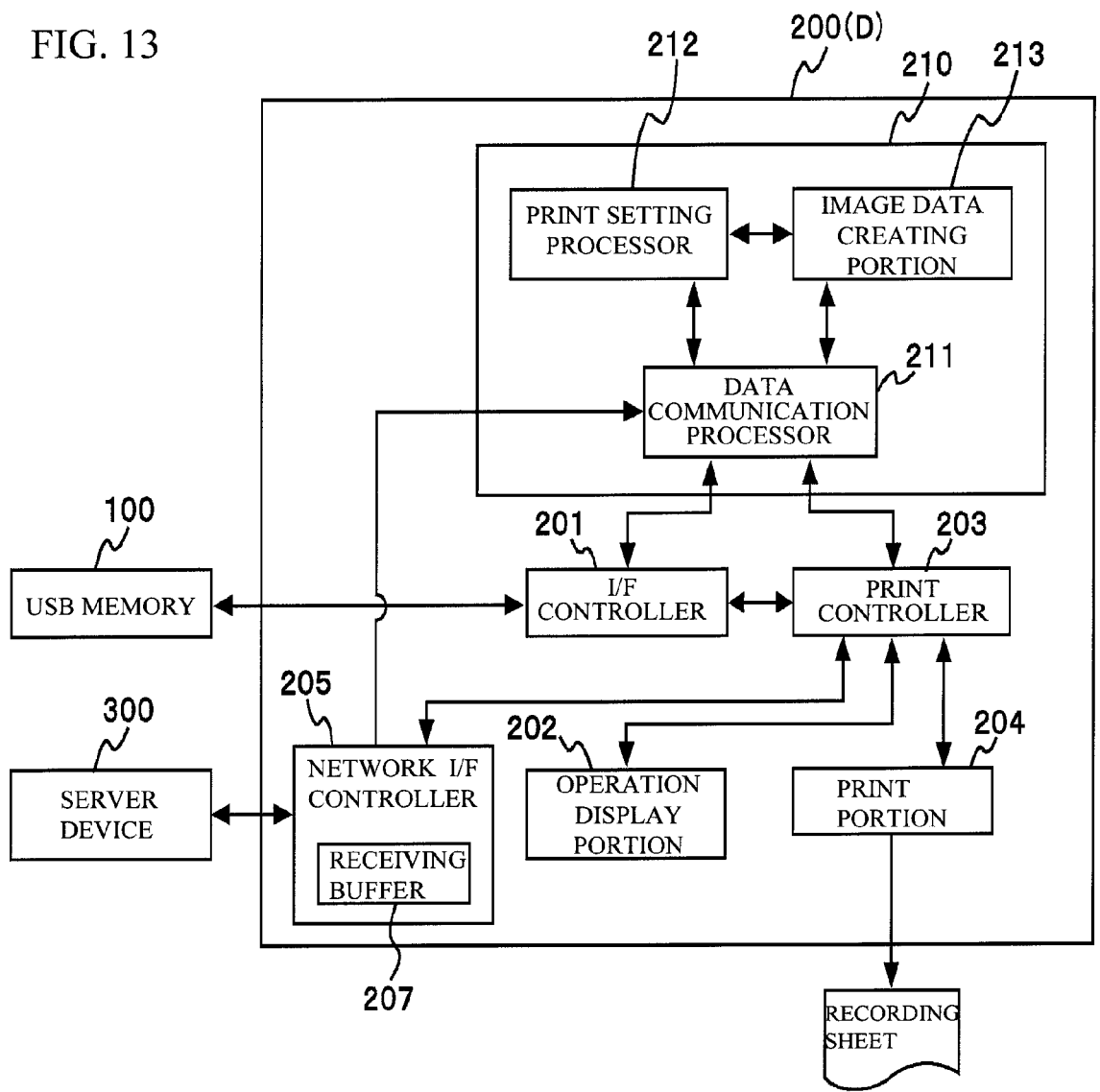
FIG. 13 is a diagram showing a printer structure of a modification of the third exemplary embodiment.

As a modification of the third exemplary embodiment shown in FIG. 11, it may be configured such that the data storing portion 206 is omitted. FIG. 13 shows the structure of the modification thereof.

In this configuration, the network I/F controller 205 includes a receiving buffer 207. The received print data is sequentially stored in the receiving buffer 207. The data processor 210 reads the print data stored in the receiving buffer 207 through the data communication processor 211. By the print setting processor 212 and the image data creating portion 213, the command is analyzed, and the image data is created. In an area of the receiving buffer 207, into which the data is read by the data communication processor 211, the print data is sequentially overwritten with newly received print data.

The foregoing exemplary embodiments are the exemplary embodiments employed in the present invention. However, the invention is not limited thereto, and various modifications may be made without departing from the scope of the invention.

Figure 14:
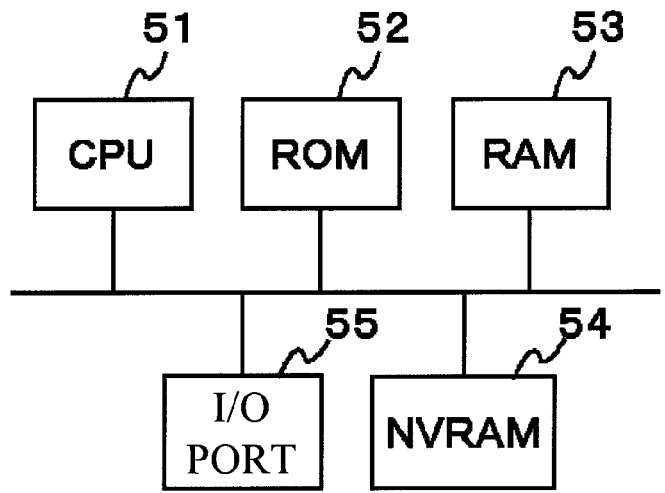
FIG. 14 is a diagram showing a structure when the invention is accomplished by a program control.

For example, the data processor 210 and the print controller 203 shown in FIG. 1, FIG. 9, FIG. 11, and FIG. 13 can be achieved by software control. FIG. 14 shows a structure of a control apparatus for functioning as the data processor 210 and the print controller 203 by the software control. Functions of each device are performed by reading a program stored in a ROM 52 by means of a CPU 51 and executing calculation, according to the program by means of the CPU 51. A calculation procedure implemented by the CPU 51 is processed according to the flowcharts shown in FIG. 5A, FIG. 5B, FIG. 6, FIG. 10A, FIG. 10B, FIG. 12A and FIG. 12B. Further, the data of calculation result is recorded on a RAM 53. Data needed to be backed up is stored in an NVRAM (Non Volatile RAM) 54, when the power is turned off.

As the program stored in the ROM 52, a program stored in a recording medium such as a CD-ROM may be read and stored in the NVRAM 54, or a program transmitted via a network may be received by the network I/F controller 205, and be stored in the NVRAM 54.

Further, in the foregoing exemplary embodiments, the print management data of the print completed print data is deleted. However, the print data in which the print completed page is matched with the number of pages of the print management data may be determined as print completed data to prohibit printing such data.

A printing process employed according to an aspect of the present invention is performed with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

CROSS-REFERENCE TO RELATED APPLICATIONS

This application is based on and claims priority under 35 USC 119 from Japanese Patent Application No. 2006-205803 filed Jul. 28, 2006.

What is claimed is:

1. A printing apparatus comprising:
a detecting portion that detects a connection with a removable recording medium that stores print management data which includes a file name of print data, print completed page information that indicates a print completed page, and an access information for accessing a server apparatus;
a determining portion that determines whether the print management data indicates that the print data is incompletely printed print data based on the print completed page information when the connection with the removable recording medium is detected by the detecting portion; and
a printing portion that accesses the server apparatus using the access information, acquires the print data with the file name from the accessed server apparatus, and prints the acquired print data when the determining portion determines that the print management data indicates that the print data is incompletely printed print data.

2. The printing apparatus according to claim 1, further comprising a rewriting portion that rewrites the print completed page information stored in the removable recording medium, whenever printing one page is completed.

3. The printing apparatus according to claim 1, wherein the reading portion reads print data recorded with management data including the print completed page information as print target data.

4. The printing apparatus according to claim 3, further comprising a deleting portion that deletes the management data, when printing all pages of the print data is completed.

5. The printing apparatus according to claim 1, wherein the printing portion stops printing the print data, when the detecting portion no longer detects the connection with the removable recording medium.

6. The printing apparatus according to claim 1, wherein when there is print data in which printing is partially complete, the print data is printed preferentially.

7. The printing apparatus according to claim 1, wherein the print management data includes a number of pages of the print data, and
the determining portion determines whether the print management data indicates that the print data is incompletely printed print data based on whether the number of pages of the print data matches the print completed page.

8. A printing apparatus comprising:
A detecting portion that detects a connection with a removable recording medium that stores print management data which includes a file name of print data, print completed paged information that indicates a print completed page, and address information of server apparatus;
a determining portion that determines whether the print management data indicates that the print data is incompletely printed print data based on the print completed page information when the connection with the removable recording medium is detected by the detecting portion; and
a printing portion that accesses the server apparatus using the address information, acquires the print data with the file name from the accessed server apparatus, and prints the acquired print data when the determining portion determines that the print management data indicates that the print data is incompletely printed print data.

9. The printing apparatus according to claim 8, further comprising a transmitting portion that transmits the print completed page information to the server apparatus, whenever printing one page is completed.

10. The printing apparatus according to claim 8, wherein when there is print data in which printing is partially complete, the print data is printed preferentially.

11. A printing apparatus comprising:
a detecting portion that detects a connection with a removable recording medium that stores print management data which includes a file name of print data, print completed page information that indicates a print completed page, an access information for accessing a server apparatus, and address information of the server apparatus;
a determining portion that determines whether the print management data indicates that the print data is incompletely printed print data based on the print completed page information when the connection with the removable recording medium is detected by the detecting portion; and
a printing portion that accesses the server apparatus using the address information and the access information, acquires the print data with the file name from the accessed server apparatus, and prints the acquired print data when the determining portion determines that the print management data indicates that the print data is incompletely printed print data.

12. The printing apparatus according to claim 11, wherein when there is print data in which printing is partially complete, the print data is printed preferentially.

13. A print system comprising:
a removable recording medium that stores print management which includes a file name of print data, completed page information that indicates a print completed page, and an access information for accessing a server apparatus; and
a printing apparatus including a detecting portion that detects a connection with the removable recording medium, a determining portion that determines whether the print management data indicates that the print data is incompletely printed print data based on the print completed page information when the connection with the removable recording medium is detected by the detecting portion, and a printing portion that accesses the server apparatus using the access information, acquires the print data with the file name from the accessed server apparatus, and prints the acquired print data when the determining portion determines that the print management data indicates that the print data is incompletely printed print data.

14. The print system according to claim 13, wherein the printing apparatus comprises a transmitting portion that transmits the print completed page information to the server apparatus, whenever printing one page is completed.

15. The print system according to claim 13, wherein the reading portion reads print data recorded with management data including the print completed page information as print target data.

16. The print system according to claim 15, wherein the printing apparatus comprises a deleting portion that deletes the management data when printing all pages of the print data is completed.

17. The print system according to claim 13, wherein the printing portion stops printing the print data when the detecting portion no longer detects the connection with the removable recording medium.

18. A printing system comprising:
a server apparatus that stores print data; and
a printing apparatus including a detecting portion that detects a connection with a removable recording medium that stores print management data which includes a file name of print data, print completed page information that indicates a print completed page, address information of the server apparatus, and an access information for accessing the server apparatus, a determining portion that determines whether the print management data indicates that the print data is incompletely printed print data based on the print completed page information when the connection with the removable recording medium is detected by the detecting portion, and a printing portion that accesses the server apparatus using the address information and the access information, acquires the print data with the file name from the accessed server apparatus, and prints the acquired print data when the determining portion determines that the print management data indicates that the print data is incompletely printed print data.

19. The print system according to claim 18, wherein the printing apparatus comprises a rewriting portion that rewrites the print completed page information stored in the removable recording medium, whenever printing one page is completed.

20. A non-transitory computer readable medium storing a program causing a computer to execute a process for printing, the process comprising:
detecting a connection with a removable recording medium that stores print management data which includes a file name of print data, print completed page information that indicates a print completed page, and an access information for accessing a server apparatus;
determining whether the print management data indicates that the print data is incompletely printed print data based on the print completed page information when the connection with the removable recording medium is detected;
accessing the server apparatus using the access information;
acquiring the print data with the file name from the accessed server apparatus and
printing the acquired print data when determining that the print management data indicates that the print data is incompletely printed print data.

21. A non-transitory computer readable medium storing a program causing a computer to execute a process for printing, the process comprising:
detecting a connection with a removable recording medium that stores print management data which includes a file name of print data, print completed page information that indicates a print completed page, and address information of a server apparatus;
determining whether the print management data indicates that the print data is incompletely printed print data based on the print completed page information when the connection with the removable recording medium is detected;
accessing the server apparatus using the address information;
acquiring the print data with the file name from the accessed server apparatus; and printing the acquired print data when determining that the print management data indicates that the print data is incompletely printed print data.

22. A non-transitory computer readable medium storing a program causing a computer to execute a process for printing, the process comprising:

detecting a connection with a removable recording medium that stores print management data which includes a file name of print data, print completed page information that indicates a print completed page, an access information for accessing a server apparatus, and address information of the server apparatus;

determining whether the print management data indicates that the print data is incompletely printed print data based on the print completed page information when the connection with the removable recording medium is detected;

accessing the server apparatus using the address information and the access information;

acquires the print data with the file name from the accessed server apparatus; and printing the acquired print data when determining that the print management data indicates that the print data is incompletely printed print data.

* * * * *